March 8, 1955 D. L. ARENBERG 2,703,867

DELAY LINE

Filed May 6, 1946 2 Sheets-Sheet 1

INVENTOR
DAVID L. ARENBERG

BY [signature]

ATTORNEY

INVENTOR
DAVID L. ARENBERG

BY M. O. Hayes

ATTORNEY 2,703,867

DELAY LINE

David L. Arenberg, Rochester, Mass., assignor, by mesne assignments, to the United States of America as represented by the Secretary of the Navy Application May 6, 1946, Serial No. 667,708

11 Claims. (Cl. 333—30)

This invention relates to a variable solid supersonic delay line and more particularly to a solid supersonic delay line having a slideable wedged portion to vary the delay offered by the line to supersonic energy passing therethrough.

A variable solid supersonic delay line constructed according to the principles of this invention provides a novel and advantageous means for varying the delay time of electrical energy as is essential in many electronic devices. It also provides means for accurately checking angles between solid opaque surfaces. Furthermore it provides means whereby temperature effects and other variables in an associated circuit can readily be compensated for by varying the delay obtained in the delay line. It is advantageous over variable supersonic delay lines as heretofore used such as, for example, liquid delay lines in the characteristics as described hereafter. It offers less attenuation to the energy being transmitted therethrough, due to the properties of the material such as quartz or glass from which it may be constructed. Likewise it is more shockproof. Furthermore it has a lower temperature coefficient thus providing a line which is more stable to fluctuations in temperature. It also enables the use of the transverse mode of propagation of sound energy instead of the conventional compressional mode, which heretofore was essential, thereby improving the acoustic matching in the liquid interface located between the sliding surfaces.

It is accordingly an object of this invention to provide a solid supersonic delay line.

A further object of this invention is to provide a solid supersonic delay line having means for varying the duration of the delay of the energy being transmitted through the line.

A still further object of this invention is to provide a variable supersonic delay line utilizing the transverse mode of propagation for transmission of the supersonic mechanical vibrations therethrough.

Another object of the present invention is to provide a variable solid supersonic delay line having a wedged section to vary the duration of the supersonic mechanical vibrations propagated therethrough.

Still another object of this invention is to provide a variable solid supersonic delay line, having a low temperature coefficient thus being less effected by fluctuations in temperature than supersonic delay lines previously known in the art.

A further object of this invention is to provide a variable solid supersonic delay line which is substantially shockproof.

Another object of this invention is to provide a variable delay line which minimizes the attenuation of the supersonic mechanical vibrations propagated therethrough.

All of these objects and other objects and advantages of this invention will become apparent upon a careful consideration of the following specification when taken in connection with the accompanying figures in which.

A variable supersonic delay line as contemplated by this invention consists of a solid line cut in two or more sections, one of which is a wedge shaped section. This wedge shaped section is used as a wedge to lift a remaining section. The path of the sound beam between the transmitting and receiving crystals, mounted on opposite ends of the line, can thus be varied without appreciably affecting the supersonic mechanical vibrations being propagated therethrough. It has been discovered that a delay line as contemplated by this invention, being made of a material such as quartz or glass, will minimize the attenuation of the supersonic energy being transmitted through the line. Quartz and glass also have a lower temperature coefficient and are more shockproof than materials heretofore used in the construction of variable supersonic delay lines. Thus the contemplated line will be more stable to fluctuations in temperature and will also be more shockproof than heretofore.

Figure 1:
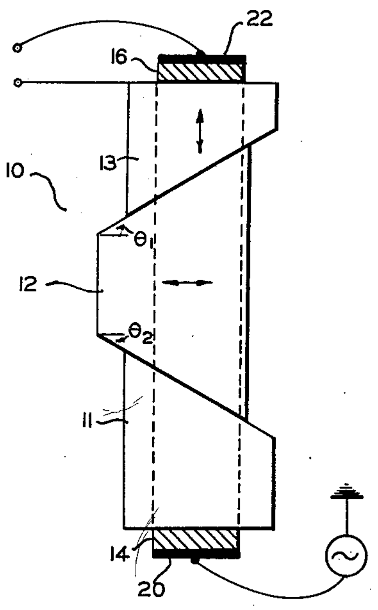
Fig. 1 is a schematic partially sectional view of an embodiment of this invention.

Referring to the drawings and more particularly to Fig. 1 there is disclosed an embodiment of this invention in its simplest form. This embodiment comprises a solid line 10 of isotropic material such as, for example, fused quartz or glass between a transmitting crystal 14 and a receiving crystal 16. Metal foil electrodes 20 and 22 are attached to the outer face of crystals 14 and 16 respectively. The line may be cylindrical, rectangular or any shape, symmetrical or otherwise as desired. The solid line 10 is cut into three sections, a bottom stationary section 11, a middle wedge shaped section 12, and a movable end section 13. The sections are mounted in a restraining and guiding mechanism (not shown), such that wedge shaped section 12 is slidable in a plane perpendicular to the direction of propagation of the sound beam and the movable end section 13 will move only in a plane parallel to the direction of propagation of the sound beam. A liquid film such as, for example, an oil film is placed between the sliding surfaces of the three sections to conduct the supersonic energy being propagated in the line from one section of the line to the next. The sliding surfaces are formed of matched accurately ground planes having no irregularities comparable to the wave length of sound being propagated in the line.

In operation movement of wedge section 12 in a direction perpendicular to the propagation of the energy in the line varies the length of the line. This variation in length causes a variation in the time required for the supersonic mechanical vibrations to travel from transmitting crystal 14 to receiving crystal 16, with a resultant variation in the duration of the delay of electrical energy between electrodes 20 and 22. The total variation of this delay is limited only by the fact that the parallel sides of section 12 can not cross the path of the sound beam traveling from crystal 14 to crystal 16. The wedge angle $\theta_1$ plus $\theta_2$ (angle formed between interface and line perpendicular to direction of propagation of energy) of section 12 must be sufficiently large to throw the reflected energy from the interface of sections 11 and 12 and sections 12 and 13 out of the sound beam going to the receiving crystal. This is essential in order to prevent spurious signals being received at the receiving crystal.

Figure 2:
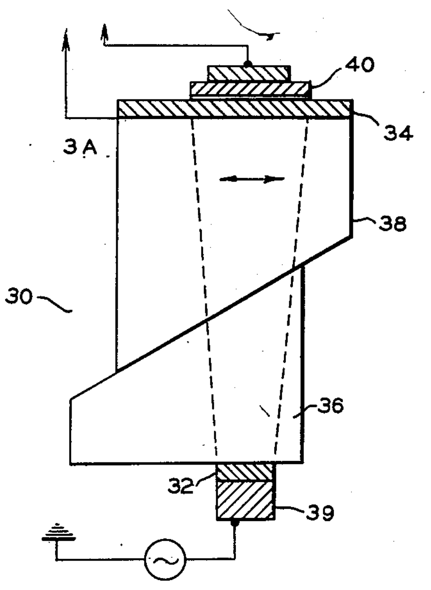
Fig. 2 is a schematic partially sectional view of a modification of this invention.

A modified embodiment of this invention having only one wedge shaped sliding surface is disclosed in Fig. 2. This embodiment comprises a solid line 30 interposed between a transmitting crystal 32 and a receiving crystal 34. Line 30 is cut at an angle other than 90° to the direction of propagation of energy through the line into sections 36 and 38. Section 38 with its attached receiving crystal 34 acts as a wedge. By moving this section in a direction perpendicular to the direction of propagation of energy in the line the distance and thus the delay obtained, between electrodes 39 attached to crystal 32 and electrode 40 slidably mounted on crystal 34 can be varied. Electrode 40 is fixed in respect to the horizontal position of section 36 (by means of restraining and guiding mechanism not shown) but moves up and down vertically as section 38 moves horizontally.

As shown in Fig. 2 electrode 39 is preferably formed of a material capable of absorbing supersonic sound waves such as, for example, lead in order to improve the performance of the line. Likewise, electrode 40 is provided with a coating of supersonic absorbing material on the side opposite crystal 34 for the same purpose. It is to be understood, however, that a delay line having simple electrodes in the absence of supersonic absorbing material is contemplated by this invention.

Figure 3:
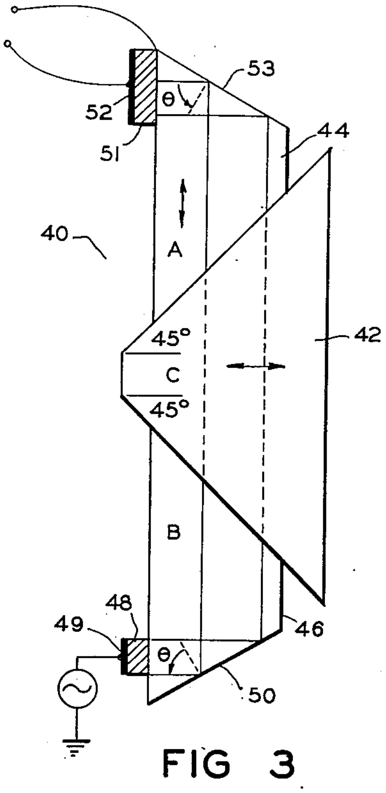
Fig. 3 is a schematic partially sectional view of a preferred embodiment of this invention suitable for utilizing the transverse mode of supersonic mechanical vibrations for transmission of energy.

Referring to Fig. 3 there is disclosed a preferred embodiment of this invention, in which the transverse mode of propagation is employed using X-cut crystals. The line 40 comprises a wedge shaped section 42 slidably mounted between two wedge shaped sections 44 and 46. The width of section 42 is greater than the width of 44 and 46, thus allowing a greater variation of delay time than is possible if all three sections are of equal width. An X-cut crystal 48 with its associated electrode 49 is attached near the end of the longer side of section 46. Crystal 48 is positioned such that the compressional mode transmitted by its strikes the end beveled surface 50 at such an angle that complete transfer to the transverse mode is obtained. Receiving crystal 51 with its associated electrode 52 is similarly located at the opposite end of the line, so that supersonic energy in the transverse mode upon striking beveled surface 53 is reconverted to the compressional mode prior to contact with crystal 51.

This embodiment thus allows the use of the transverse mode while using an X-cut crystal. The previous two embodiments upon using a Y-cut crystal would propagate the transverse mode.

Figure 4:
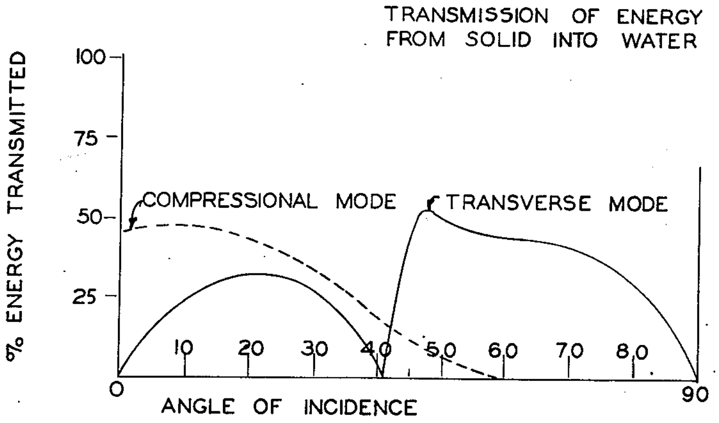
Fig. 4 is a graph showing the comparative transmission of the transverse and compressional modes upon being propagated from a solid into water.

As shown in Fig. 4 the transverse mode of propagation is advantageous over the compressional mode in that upon transmission of energy through the liquid interface at the sliding surfaces a greater percent of the energy is transmitted. It is of further advantage as represented on the graph in that a larger wedge angle can be employed thus providing a greater variation of delay time.

While different embodiments of this invention have been disclosed and described, it is to be understood that various other changes and modifications may be made herein without departing from the spirit and scope of the appended claims.

What is claimed is:

1. A variable solid supersonic delay line for adjustably varying the delay time offered by said line to energy passing therethrough comprising a fixed section, a second section movable solely in the direction of propagation of said energy passing through said line, and a wedge shaped section conductive of said energy interposed between said first and second sections for varying the relative spacing of said first and second sections to adjustably vary the duration of the delay offered by the line.

2. A variable solid delay line for adjustably varying the delay time offered by said line to energy passing therethrough comprising a fixed section, a second section movable solely in the direction of propagation of said energy passing through said line, a wedge shaped section conductive of said energy interposed between said first and second sections for varying the relative spacing of said first and said second sections, means attached to one end of said line for converting electrical energy to mechanical vibration, and means attached to the other end of said line for reconverting mechanical vibrations to electrical energy.

3. A variable supersonic delay line for adjustably varying the delay time offered by said line to energy passing therethrough comprising a fixed section, a second section movable solely in the direction of propagation of energy passing through said line, a third section conductive of said energy interposed between said first and second sections movable in a direction transverse to the direction of propagation of said energy in said line, for adjustably varying the spacing between opposite ends of said line, a quartz crystal attached to one end of said line for converting electrical energy into supersonic mechanical vibrations, and a second quartz crystal attached to the other end of said line for reconverting supersonic mechanical vibrations to electrical energy.

4. A variable solid delay line for adjustably varying the delay time offered by said line to energy passing therethrough comprising a fixed section, a second section movable in the direction of propagation of said energy in said line, a third section conductive of said energy interposed between said first and second sections movable solely in a direction transverse to the direction of propagation, means at one end of said line for converting electrical energy to supersonic mechanical vibrations in the compressional mode, means at the same end of said line for converting said supersonic mechanical vibrations of said compressional mode to supersonic mechanical vibrations in the transverse mode, means attached to the other end of said line for reconverting vibrations of the transverse mode to mechanical vibrations of the compressional mode, and means attached to said other end of said line for reconverting said supersonic mechanical vibration to electrical energy.

5. A variable delay line for supersonic energy comprising, a length of solid material conductive of supersonic energy, said length of material being divided into sections, each of said sections being maintained substantially in contact with neighboring sections, means for introducing energy into one of said sections, means for extracting supersonic energy from another of said sections, and means for moving a third of said sections while maintaining substantial contact with neighboring sections to vary the distance between said energy introducing means and said energy extracting means.

6. A variable delay line for supersonic energy comprising, a length of material conductive of supersonic energy, said length of material being divided into sections, one of said sections being movable in a first direction, the others of said sections being restrained from movement in said first direction, said movable section having the shape of a wedge and being maintained substantially in contact with others of said sections at all times, means for introducing energy into one of said restrained sections, means for extracting energy from the other of said restrained sections, whereby movement of said wedge shaped section in a direction transverse to said first direction causes a variation of the distance between said energy introducing means and said energy extracting means.

7. A variable delay line for supersonic energy comprising, a length of material conductive of supersonic energy, said length of material being split into a plurality of abutting sections, a transmitting crystal attached at one end of said length of material for introducing a compressional wave of supersonic energy at said one end, a receiving crystal attached to the other end of said length of material for extracting said compressional wave of supersonic energy at said other end, one of said sections being wedge shaped and slidable relative to sections abutting thereon, whereby variation of the position of said wedge shaped section causes variation of the distance between said transmitting crystal and said receiving crystal.

8. A variable delay line for supersonic energy comprising, a length of material conductive of supersonic energy, said material being split into a plurality of abutting sections, a transmitting crystal attached to a lateral surface adjacent one end of said length of material for introducing a transverse wave of supersonic energy into said length of material, a receiving crystal attached to a lateral surface adjacent the other end of said length of material for extracting said transverse wave of supersonic energy from said length of material, one of said plurality of sections being wedge shaped and slidable relative to sections abutting thereon, whereby variation of the position of said wedge shaped section causes variation of the distance between said transmitting crystal and said receiving crystal.

9. A variable delay line for supersonic energy comprising, a length of material conductive of supersonic energy, said material being split into three abutting sections, a transmitting crystal attached to a lateral surface adjacent one end of said length of material for introducing a transverse wave of supersonic energy thereto, a receiving crystal attached on a lateral surface adjacent the other end of said length of material for extracting said transverse wave of supersonic energy therefrom, means adjacent said one end for converting said transverse wave to a compressional wave of supersonic energy, means adjacent said other end for converting said compressional wave to a transverse wave of supersonic energy, one of said sections being wedge shaped and movable relative to said crystal supporting sections, movement of said third section causing variation of the distance between said transmitting crystal and said receiving crystal.

10. Apparatus as in claim 9 wherein said means for converting transverse waves to compressional waves comprises a beveled surface at said one end, and said means for converting the compressional waves to transverse waves comprises a beveled surface at said other end of said length of material.

11. A variable delay line for supersonic energy comprising, a length of material conductive of supersonic energy, said length of material being split into three abutting sections, oil films between said abutting sections, a transmitting crystal attached to the first of said sections for introducing compressional waves of supersonic energy into said length of material, a receiving crystal attached to the second of said sections for extracting compressional waves of supersonic energy, the third of said sections being wedge shaped and interposed between said first and second sections, said wedge shaped section being movable relative to said first and said second sections, said second section also being movable in a plane perpendicular to that in which said third section is movable whereby the distance between said transmitting and said receiving crystals may be varied.

References Cited in the file of this patent

UNITED STATES PATENTS

| | | |
|---|---|---|
| 1,551,105 | Hayes | Aug. 25, 1925 |
| 2,258,903 | Mitchell | Oct. 14, 1941 |
| 2,303,234 | Schwartzkopf | Nov. 24, 1942 |

FOREIGN PATENTS

| | | |
|---|---|---|
| 711,667 | France | Sept. 15, 1931 |